United States Patent
Weinberg

(10) Patent No.: US 7,218,536 B2
(45) Date of Patent: May 15, 2007

(54) VOLTAGE REGULATOR CONVERTER WITHOUT SWITCHING LOSSES

(75) Inventor: Simon Henry Weinberg, Wassenaar (NL)

(73) Assignee: Agence Spatiale Europeenne (FR)

( * ) Notice: Subject to any disclaimer, the term of this patent is extended or adjusted under 35 U.S.C. 154(b) by 0 days.

(21) Appl. No.: 11/472,062

(22) Filed: Jun. 21, 2006

(65) Prior Publication Data
US 2007/0008743 A1   Jan. 11, 2007

(30) Foreign Application Priority Data
Jun. 27, 2005   (FR) .................................. 05 06518

(51) Int. Cl.
H02M 3/335 (2006.01)
(52) U.S. Cl. .............................. 363/21.12; 363/21.02; 363/21.16
(58) Field of Classification Search ............. 363/21.12, 363/21.02, 21.01, 21.16
See application file for complete search history.

(56) References Cited

U.S. PATENT DOCUMENTS

| | | | | |
|---|---|---|---|---|
| 5,448,465 A | * | 9/1995 | Yoshida et al. | 363/15 |
| 5,506,764 A | * | 4/1996 | Hon et al. | 363/21.16 |
| 5,559,684 A | | 9/1996 | Ohms et al. | |
| 5,654,880 A | * | 8/1997 | Brkovic et al. | 363/17 |
| 6,005,782 A | * | 12/1999 | Jain et al. | 363/21.12 |
| 6,031,747 A | * | 2/2000 | Ilic et al. | 363/71 |
| 6,252,784 B1 | * | 6/2001 | Dobrenko | 363/21.12 |
| 6,396,719 B2 | * | 5/2002 | Morita et al. | 363/21.12 |
| 6,414,856 B1 | * | 7/2002 | Ambatipudi et al. | 363/21.12 |
| 6,639,813 B2 | * | 10/2003 | Yamagishi et al. | 363/21.12 |
| 6,717,827 B2 | * | 4/2004 | Ota | 363/21.12 |

FOREIGN PATENT DOCUMENTS

| | | |
|---|---|---|
| EP | 0 387 563 | 9/1990 |
| EP | 1 160 962 | 12/2001 |

* cited by examiner

*Primary Examiner*—Bao Q. Vu
(74) *Attorney, Agent, or Firm*—Bachman & LaPointe

(57) ABSTRACT

The invention concerns a converter which includes two input terminals and two output terminals, a main transformer presenting primary and secondary windings connected between the input terminals and the output terminals respectively, a switching device, a first inductance and a first capacitance forming a first resonant circuit with the primary winding of the main transformer, a wound regulation transformer, presenting a primary winding, and a secondary winding connected in series with one of the windings of the main transformer, a switching device, a second inductance and a second capacitance forming a second resonant circuit with the primary winding of the regulation transformer and with this switching device and a command forming the first and second resonant circuits at a resonance frequency less than or equal to the resonance frequencies of the resonant circuits.

14 Claims, 3 Drawing Sheets

VOLTAGE REGULATOR CONVERTER WITHOUT SWITCHING LOSSES

BACKGROUND (1) Field of the Invention

The invention concerns electric supplies and in particular voltage regulator converters.

(2) Prior Art

The U.S. Pat. No. 4,943,903 to Gilbert Cardwell discloses a voltage regulator converter receiving a continuous unregulated voltage on input and providing a continuous regulated voltage on output. This converter is illustrated in FIG. 1. This converter presents a main transformer T1 presenting two primary windings E1 and E2 and secondary windings illustrated by E7. The converter presents in addition a transformer T2, containing primary windings E5 and E6 and secondary windings E3 and E4. The primary windings E1 and E2 of the transformer T1 are coupled between an unregulated source voltage Vin and the secondary windings E3 and E4 respectively of transformer T2.

A square wave signal generator includes a command SWG controlling two NMOS transistors Q1 and Q2 respectively, each arranged in series between a local ground and the windings E3 and E4. The voltage between primary windings E5 and E6 of the transformer T2 is controlled by a regulator fed by the terminal Vin and comprising capacitor C, inductance L, diode D3 and transistor Q1. The diodes D1 and D2 permit isolating the primary windings of the transformers T1 and T2. The windings E7 are connected to a rectifier assembly whose output voltage is measured. This output voltage level is provided to the input of a regulation device R1 which modifies the conduction cyclic ratio of the transistor Q3 according to the voltage level measured. The output voltage level is regulated as follows: the second transformer selectively subtracts from the primary terminals of the main transformer a part of the series voltage applied.

This converter presents disadvantages: transistors Q1 and Q2 switch when the current that crosses them is non zero and the opening of these transistors takes place when their drain-source voltage is non zero, causing a decrease in the converter performance. In addition, this solution only applies for a square wave push-pull converter.

SUMMARY OF THE INVENTION

The invention is designed to resolve one or several of these disadvantages. A complementary objective of the invention is to provide such a converter which can respond to constraints imposed by satellite systems, namely sound operational reliability (through minimization of the number of components, and simplicity of redundancy) and a minimal footprint and mass. A complementary objective of the invention is to provide such a converter adapted to operate at very high switching frequency or very high output voltage value.

The invention thus relates to a converter, including:

two input terminals for receiving an unregulated voltage;

two output terminals for the application of a regulated voltage;

one wound main transformer presenting a primary winding connected between said input terminals, and presenting a secondary winding connected between said output terminals;

a switching device, a first inductance and a first capacitance forming a first resonant circuit with the primary winding of the main transformer when this switching device is closed;

a wound regulation transformer, presenting a primary winding, and a secondary winding connected in series with one of said windings of the main transformer;

a switching device, a second inductance and a second capacitance forming a second resonant circuit with the primary winding of the regulation transformer and with this switching device when this device is closed;

a command controlling the formation of the first and second resonant circuits at a frequency less than or equal to the resonance frequencies of said resonant circuits;

a regulation circuit, selectively connecting the primary winding of the regulation transformer between the input terminals.

According to one variant, a same switching device is used to form the first and second resonant circuits.

According to one embodiment, the secondary winding of the regulation transformer is connected in series with the primary winding of the main transformer.

According to yet another variant, the secondary winding of the regulation transformer is connected so that the voltage at the primary winding terminals of the main transformer is increased when the regulation circuit connects the secondary winding of the regulation transformer between the input terminals.

According to another embodiment, the secondary winding of the regulation transformer is connected in series with the secondary winding of the main transformer.

According to one variant, a transforming ratio of the regulation transformer is at least 5 times greater than a transforming ratio of the main transformer.

According to another variant, the main transformer presents a primary winding with a midpoint provided with a first winding forming said primary winding of the main transformer and provided with a second winding; the regulation transformer presents a primary winding with a midpoint provided with a first winding forming said primary winding of the regulation transformer and provided with a second winding; the converter includes a second switching device, forming a third resonant circuit with the first inductance, the first capacitance and the second winding of the main transformer when it is closed, and forming a fourth resonant circuit with the second inductance, the second capacitance and the second winding of the regulation transformer when it is closed.

According to yet another variant, two diodes are connected in series in the second and fourth resonant circuits formed respectively.

According to another variant, the command controls the simultaneous opening of the switching devices of the resonant circuits for a determined duration, and in which the converter presents a voltage resonance with a period greater than the determined duration.

According to yet another variant, said switching devices are MOSFET transistors. Again, the converter may include a rectifier circuit connected between the output terminals.

According to one variant, the rectifier circuit is connected between the output terminals in the form of a load.

According to yet another variant, the resonance frequencies of the resonant circuits are substantially identical.

According to another variant, the resonance frequency of the circuit formed by the assembly of the resonant circuits is greater than or equal to the frequency of the control of the formation of the first and second resonant circuits.

BRIEF DESCRIPTION OF THE DRAWINGS

Other features and advantages of the invention will clearly stand out from the description that is made below, by way of indicative and non-restrictive examples, in reference to the attached drawings, in which.

DETAILED DESCRIPTION OF THE PREFERRED EMBODIMENT(S)

The invention proposes a converter provided with a main transformer and a regulation transformer. The regulation transformer presents a secondary winding placed in series with a winding of the main transformer. A winding of the primary winding of the main transformer is placed in a first resonant circuit whose opening and closing are controlled by a switching device. A winding of the primary winding of the regulation transformer is placed in a second resonant circuit whose opening and closing are controlled by the switching device. The resonance frequencies of the first and second circuits are at least equal to the opening or closing frequencies of the switching device. The switching of the switching device thus takes place at zero current. Advantageously, the resonance frequencies of the first and second resonant circuits are substantially identical, so that the shape of the current crossing the switching device is substantially identical and so the switching at zero current is preserved, whatever the load at the output.

Figure 1:
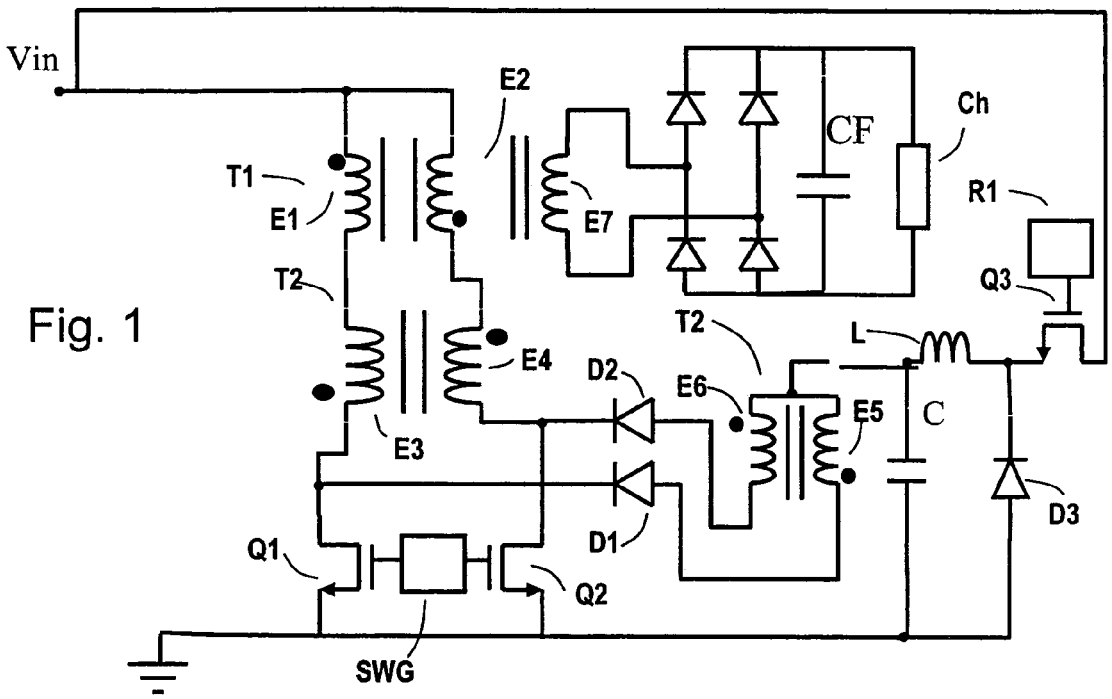
FIG. 1 illustrates a voltage regulator converter according to prior art.
Figure 2:
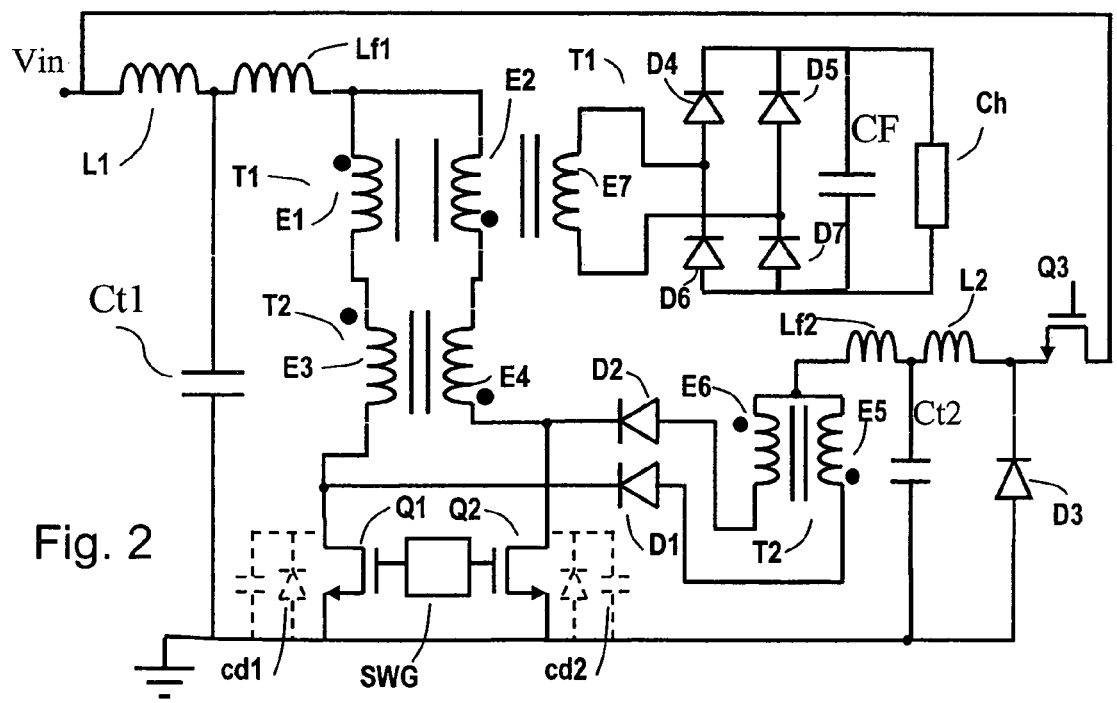
FIG. 2 illustrates an example of a voltage regulator converter according to the invention.

FIG. 2 represents one embodiment of a converter according to the invention, more particularly adapted to the dc-dc conversion. The converter receives as input an unregulated voltage applied between the terminal Vin and the local ground.

The converter presents a main transformer T1. Transformer T1 presents a primary winding with a midpoint provided with two windings E1 and E2. The transformer T1 presents a secondary winding connected to a known per se rectifier circuit, supplying a load Ch. Transformer T1 typically presents a transforming ratio of 1:1.

The converter presents a regulation transformer T2. Transformer T2 includes two primary windings E5 and E6 and two secondary windings E3 and E4. Windings E3 and E4 are not wound around the same core as windings E1 and E2. The converter presents switching devices Q1 and Q2, which in the example are NMOS type transistors. The switching devices Q1 and Q2 are controlled so as to form a Push-Pull assembly. Q1 and Q2 are controlled in a known per se manner by a command SWG. An input capacitance Ct1 and an inductance Lf1 are connected in series with switching device Q1, winding E1 and winding E3 to form a first resonant circuit when the switching device Q1 is closed. The input capacitance Ct1 and the inductance Lf1 are also connected in series with switching device Q2, winding E2 and winding E4 to form a third resonant circuit when the switching device Q2 is closed. By construction, the resonance frequencies of these two resonant circuits are substantially identical.

Moreover, the converter presents a second capacitance Ct2 and a second inductance Lf2 connected in series with winding E5 and switching device Q1 to form a second resonant circuit when the switching device Q1 is closed. The capacitance Ct2, the second inductance Lf2, the switching device Q2 and winding E6 are also connected to form a fourth resonant circuit when the switching device Q2 is closed. By construction, the resonance frequencies of these two resonant circuits are substantially identical.

The third and fourth circuits are supplied by a regulator circuit whose structure is known per se. The regulator per se circuit illustrated is a voltage dropper. This circuit includes a switching device Q3 and a unidirectional conduction element D3 connected in series between the terminal Vin and the local ground. This circuit also includes an inductance L2, one electrode of which is connected to one electrode of Q3 and one electrode of D3, and whose other electrode is connected to the junction between the capacitance Ct2 and the inductance Lf2. The switching device Q3 in this case is a NMOS transistor whose drain is connected to the terminal Vin. The unidirectional conduction device D3 in this case is a diode whose anode is connected to the local ground and whose cathode is connected to the source of the transistor Q3.

Figure 3:
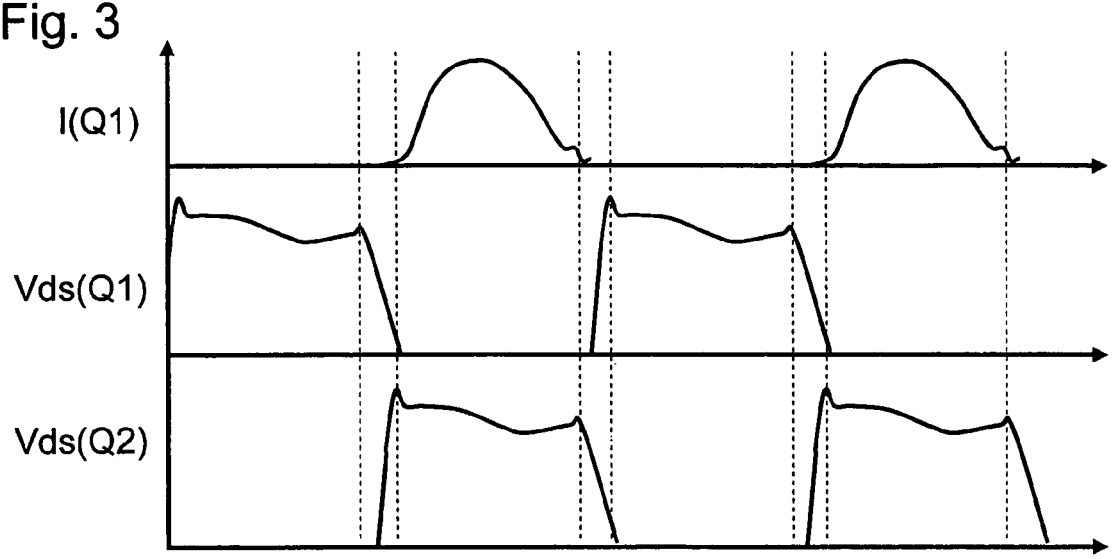
FIG. 3 illustrates the current crossing the switching devices Q1 or Q2 as well as the voltage between their terminals at full load.
Figure 4:
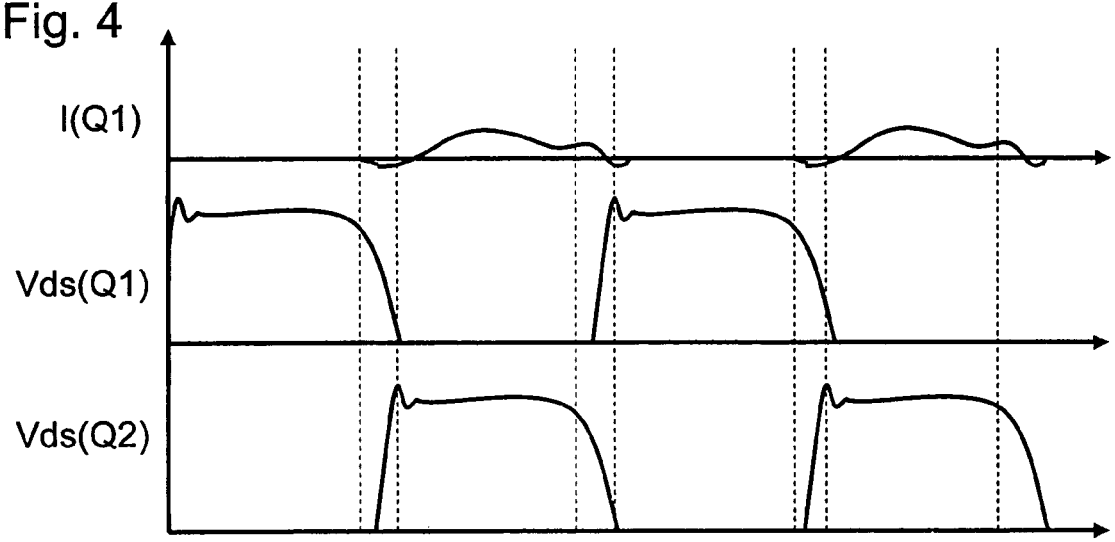
FIG. 4 illustrates the current and the voltage at reduced load.

The resonance frequencies of the resonant circuits are at least equal to the opening or closing frequency of each push-pull switching device. Thus, as illustrated in the diagrams of FIGS. 3 and 4, the switching of push-pull switching devices is done when they are crossed by a nearly zero current, whatever the load fed by the secondary winding of the main transformer T1. The converter performance and its interference generation are thus considerably improved. For an optimal performance, the resonance frequencies of the resonant circuits are substantially equal to the opening or closing frequency of each push-pull switching device.

The first and third resonant circuits are preferably configured so that their resonance frequencies are substantially equal. Similarly, the second and fourth resonance circuits are configured so that their resonance frequencies are substantially equal. Thus, as illustrated in FIGS. 3 and 4, the shape of the resonance current in a switching device is modified very little by load variations. The current thus has a roughly half sinusoidal shape during the closing period.

The resonance frequencies of these resonant circuits are dependent on the Ct1, Lf1, CT2 and Lf2 values and determine the resonance frequency of the current at the time of the closing of one of the push-pull switching devices. The resonance frequencies of these different resonant circuits thus have a link between them.

The magnetization current of the main transformer T1 being however independent of the load, its influence on the shape of the current is more visible with a reduced load.

The diagrams of FIGS. 3 and 4 have been realized with a prototype presenting a load according to FIG. 4 ten times less than the full load according to FIG. 3. With regard to a circuit technologically comparable to the prior art, this prototype presented an overall performance gain of 5%, whatever the load.

We are going to detail the operation of the regulation with the converter example of FIG. 2. An unregulated voltage varying between 45 and 50 Volts is applied between the terminal Vin and the local ground. The converter is intended to provide a regulated voltage of 50 Volts to the terminals of the load.

In the example, E1 and E3 have defined winding directions so that the voltage between the terminals of winding E1 is equal to the arithmetic sum of the voltage between the terminal Vin and the local ground and the voltage between the terminals of winding E3. In a similar fashion, the directions of windings E2 and E4 are defined so that the voltage between the terminals of winding E2 is equal to the arithmetic sum of the voltage between the terminal Vin and the local ground and the voltage between the terminals of winding E4. Advantageously, a regulation by an increase of the input voltage is used, the converter performance being then improved.

In a known per se manner, the regulation circuit measures the output voltage and modifies the duty cycle of the switching device Q3 according to the output voltage measured.

When a voltage of 45 Volts is applied as the input, the duty cycle of the switching device Q3 is 100%. An average voltage of 45 Volts is then applied to the primary winding of T2. The transformer T2 having a transforming ratio of 9:1, windings E3 and E4 then increase the voltage between the terminals of windings E1 and E2 respectively by 5 Volts. The voltage between terminals of the windings E1 and E2 then reaches Vin+5V, that is to say 50 Volts.

When a voltage of 50 Volts is applied as input, the cyclic ratio of the closing of the switching device Q3 is 0%. An average zero voltage is then applied to the midpoint of the primary winding T2. The voltage between the terminals of windings E3 and E4 then being zero, the voltage between the terminals of windings E1 and E2 is then equal to 50 Volts.

As the regulation is done by the secondary winding of the transformer T2 with a reduced voltage between the terminals of its windings, the power dissipated by the regulation transformer T2 and the regulation circuit is relatively limited; the converter performance is therefore hardly affected by the regulation. In general, transformers T1 and T2 used are such that the transforming ratio of transformer T2 is at least 5 times greater than the transforming ratio of transformer T1.

The inductance Lf1 can be formed in all or part by the leakage inductance of the primary winding of transformer T1. Likewise, the inductance Lf2 can be formed in all or part by the leakage inductance of the primary winding of transformer T2. The leakage inductance of the primary winding of these transformers can be completed by an inductive component chosen so that the resonance frequency of its circuit takes on the desired value.

FIG. 2 represents in dashed lines the capacitances cd1 and cd2. These capacitances cd1 and cd2 can be formed by the parasitic capacitances induced by the primary winding of transformer T1 and the NMOS transistors Q1 and Q2, and possibly by additional capacitors arranged in parallel. FIG. 2 also represents in dashed lines the parasitic diodes induced in the circuit, notably by the primary winding of transformer T1 and by the NMOS transistors Q1 and Q2, placed in parallel with capacitances cd1 and cd2 at the transformers' terminals. The energy stored in the magnetization inductance of transformer T1 resonates with capacitances cd1 and cd2 at the time of the opening of Q1 or Q2. The time during which switching devices Q1 and Q2 are simultaneously open is typically less than 10% of the period. This voltage resonance is planned to present a duration greater than the duration of simultaneous opening of Q1 and Q2. Thus, as the voltage between the terminals of the transistor which has just been opened remains roughly zero during its opening; and then as the voltage between the terminals of the transistor which must be closed drops to zero just before, the switching of the two transistors is realized without dissipation.

For example, at the time of the opening of transistor Q1, capacitance cd2 is charged to a voltage double the voltage of the midpoint of T1, whereas the voltage on the terminals of capacitance cd2 is substantially zero. Contrary to the prior art device described in the introduction, the magnetization inductance of T1 and capacitances cd1 and cd2 can enter into resonance before the closing of transistor Q2. Thus, the energy stored in capacitance cd2 is transferred into capacitance cd1 with a quasi-absence of losses, before the closing of transistor Q2.

The converter includes advantageously an input filtering inductance L1, connected on the one hand to the terminal Vin and on the other hand to the junction between the capacitance Ct1 and the inductance Lf1. The value of the inductance of L1 is preferably much greater than the value of the inductance Lf1. Thus, the ringing current charging the Ct1 capacitance is substantially constant.

The rectifier circuit of the example of FIG. 2 is connected to the terminals of winding E7. This rectifier circuit includes a diode bridge provided with diodes D4 to D7 and a capacitance CF connected between the output terminals of the diode bridge. The load is intended to be connected to the terminals of the capacitance CF. The converter is preferably configured so that the capacitance of Ct1 and Ct2 is much lower than the capacitance of CF.

Such a dc-dc converter can in particular be used in order to supply traveling wave tube power amplifiers or electric propulsion power units. These types of load require multiple and isolated high voltage outputs with a high performance, in particular for space applications.

Figure 5:
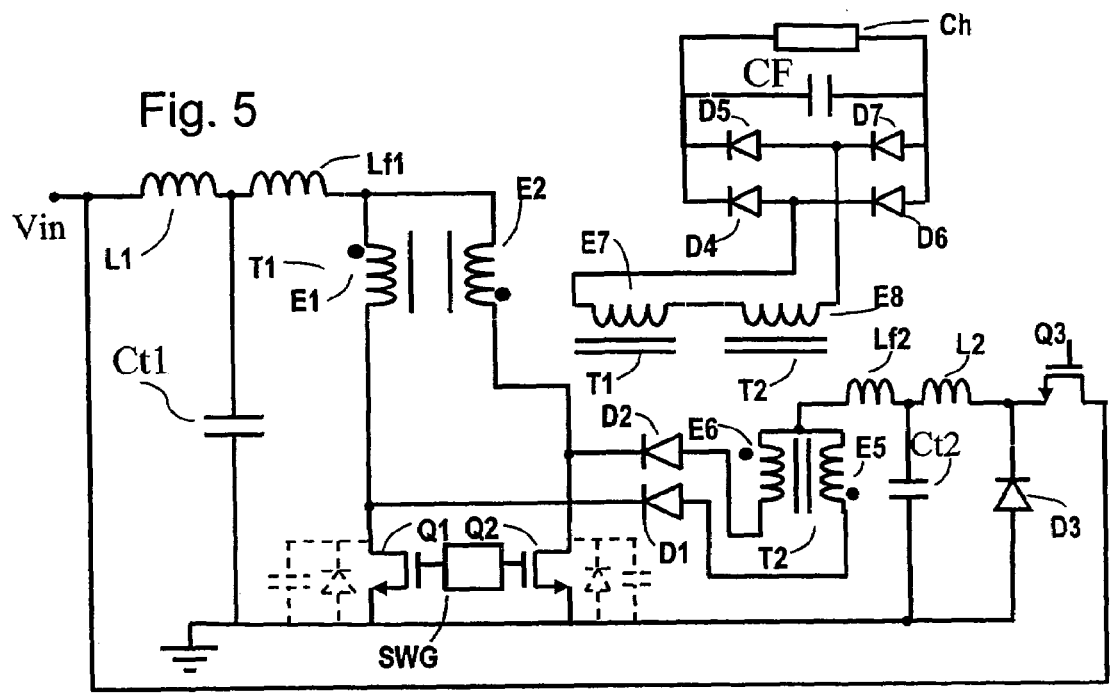
FIG. 5 illustrates another example of a voltage regulator converter according to the invention.

FIG. 5 represents an embodiment of a converter according to the invention, more specifically adapted to form alternative current or voltage buses for loads, where each load can be supplied by an adequate rectifier circuit.

The converter receives an unregulated input voltage applied between the terminal Vin and the local ground. The converter presents a main transformer T1. Transformer T1 presents a primary winding with a midpoint provided with two windings E1 and E2. Transformer T1 presents a secondary winding formed by winding E7. The converter presents a regulation transformer T2. Transformer T2 includes two primary windings E5 and E6 and a secondary winding connected in series with secondary winding E7.

A load connected to the alternative bus thus formed presents a rectifier circuit similar to the one illustrated in FIG. 2.

As in the example of FIG. 2, the converter presents:

switching devices Q1 and Q2 of the NMOS transistor type controlled in such a way as to form a Push-Pull assembly;

an input capacitance Ct1 and an inductance Lf1 connected in series with switching device Q1 and winding E1 to form a first resonant circuit when switching device Q1 is closed. Input capacitance Ct1 and inductance Lf1 are also connected in series with switching device Q2 and winding E2 to form a third resonant circuit when switching device Q2 is closed;

a second capacitance Ct2 and a second inductance Lf2 connected in series with winding E5 and switching device Q1 to form a second resonant circuit when switching device Q1 is closed. Capacitance Ct2, second inductance Lf2, switching device Q2 and winding E6 are also connected to form a fourth resonant circuit when switching device Q2 is closed;

a regulating circuit presenting substantially the same structure as the one described in reference to FIG. 2. Another type of adequate regulating circuit may of course be used.

Figure 6:
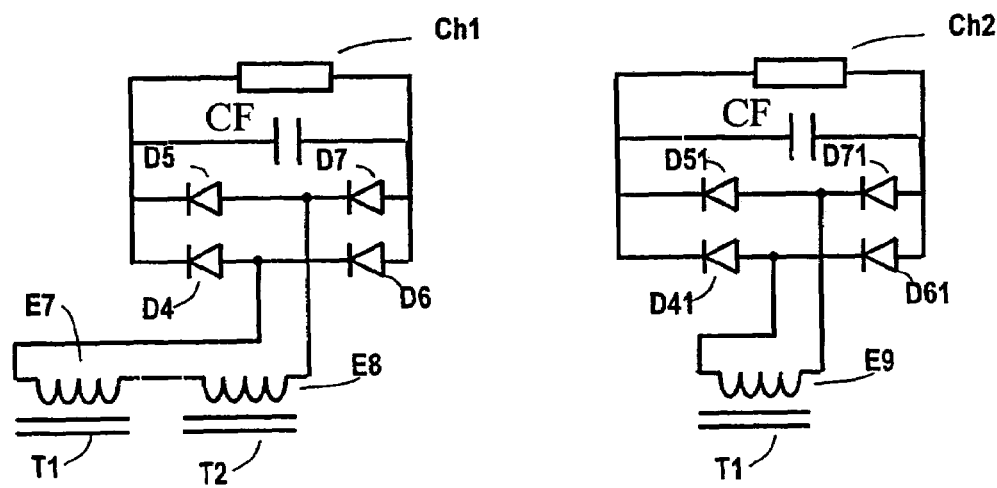
FIG. 6 illustrates different types of loads which can be connected simultaneously on secondary windings of the first transformer.

FIG. 6 illustrates different loads connected simultaneously to a secondary winding of transformer T1. The load ch1 is thus identical to the load Ch illustrated in FIG. 5. Load ch2 presents a secondary winding E9 of transformer T1 but no secondary winding of transformer T2 arranged in series with E9. The load ch2 presents a rectifier circuit connected to the terminals of winding E9 and containing a diode bridge provided with diodes D41, D51, D61 and D71 and a capacitance CF connected between the output terminals of the diode bridge. Although only one load of each type has been illustrated, several loads similar to ch1 or ch2 can be connected simultaneously.

Different operations can be then considered. So when input voltage Vin is unregulated, the voltage on load ch2 is also unregulated, whereas the voltage on load ch2 can be regulated via transformer T2. When input voltage Vin is regulated, the voltage on load ch2 is also regulated. The voltage on load ch1 can be adjusted by means of switching device Q3 of the regulating circuit.

The converters illustrated in FIGS. 2, 5 and 6 include advantageously unidirectional conduction devices D1 and D2 connected in series between a winding E5 or E6 and a switching device Q1 or Q2. These unidirectional conduction devices permit isolation of the primary windings of transformers T1 and T2. Unidirectional conduction devices in this case are diodes whose anodes are connected to the far end of a respective winding E5 or E6.

In the embodiments illustrated, a push-pull is used. We could however also consider a converter using only a single switching device in series with a single primary winding of the main transformer. In the illustrated embodiments, the push-pull switching devices are NMOS transistors. We could of course use in replacement any other suitable type of switching device. In the embodiments illustrated, the regulation circuit includes a voltage dropper. We could also consider using a voltage booster. In the illustrated embodiments, the capacitance and the inductance of every resonant circuit can be formed partially or entirely of parasitic elements of the converter components.

The invention claimed is:

1. A converter which includes:
   two input terminals for receiving an unregulated voltage;
   two output terminals for the application of a regulated voltage;
   a wound main transformer presenting a primary winding connected between said input terminals, and presenting a secondary winding connected between said output terminals;
   a first switching device, a first inductance and a first capacitance forming a first resonant circuit with the primary winding of the main transformer when the first switching device is closed;
   a wound regulation transformer, presenting a primary winding, and a secondary winding connected in series with one of said windings of the main transformer;
   said first switching device, a second inductance and a second capacitance forming a second resonant circuit with the primary winding of the regulation transformer and with the said switching device when the second switching device is closed;
   a command controlling the formation of the first and second resonant circuits at a resonance frequency less than or equal to resonance frequencies of said resonant circuits; and
   a regulation circuit selectively connecting the primary winding of the regulation transformer between the input terminals.

2. The converter according to claim 1, in which a single switching device that is used to form the first and second resonant circuits.

3. The converter according to claim 1, in which the secondary winding of the regulation transformer is connected in series with the primary winding of the main transformer.

4. The converter according to claim 3, in which the secondary winding of the regulation transformer is connected so that a voltage at the primary winding terminals of the main transformer is increased when the regulation circuit connects the secondary winding of the regulation transformer between the input terminals.

5. The converter according to claim 1, in which the secondary winding of the regulation transformer is connected in series with the secondary winding of the main transformer.

6. The converter according to claim 1, in which a transforming ratio of the regulation transformer is at least 5 times greater than a transforming ratio of the main transformer.

7. The converter according to claim 1 in which the main transformer presents a primary winding with a midpoint provided with a first winding forming said primary winding of the main transformer and provided with a second winding;
   in which the regulation transformer presents a primary winding with a midpoint provided with a first winding forming said primary winding of the regulation transformer and provided with a second winding; and
   including a second switching device, forming a third resonant circuit with the first inductance, the first capacitance and the second winding of the main transformer when the second switching device is closed, and forming a fourth resonant circuit with the second inductance, the second capacitance and the second winding of the regulation transformer when the second switching device is closed.

8. The converter according to claim 7, in which two diodes are connected in series in the second and fourth resonant circuits formed respectively.

9. The converter according to claim 7, in which the command controls the simultaneous opening of the first and second switching devices of the resonant circuits during a determined duration, and in which the converter presents at the time of the simultaneous opening a voltage resonance of a period greater than a determined duration.

10. The converter according to claim 1, in which said first and second switching devices are MOSFET transistors.

11. The converter according to claim 1, containing a rectifier circuit connected between the output terminals.

12. The converter according to claim 11, in which the rectifier circuit is connected between the output terminals in the form of a point of load.

13. The converter according to claim 1, in which the resonance frequencies of the resonant circuits are substantially identical.

14. The converter according to claim 1, in which the resonance frequency of the circuit formed by the assembly of the resonant circuits is greater than or equal to the frequency of the control of the formation of the first and second resonant circuits.

* * * * *